(12) United States Patent
Yustus

(10) Patent No.: US 9,689,737 B2
(45) Date of Patent: Jun. 27, 2017

(54) INTERLOCKING TEST WEIGHT SYSTEM

(71) Applicant: Konecranes Plc, Hyvinkää (FI)

(72) Inventor: Joseph A. Yustus, Hartford, WI (US)

(73) Assignee: KONECRANES GLOBAL CORPORATION, Hyvinkää (FI)

(*) Notice: Subject to any disclaimer, the term of this patent is extended or adjusted under 35 U.S.C. 154(b) by 259 days.

(21) Appl. No.: 14/513,558

(22) Filed: Oct. 14, 2014

(65) Prior Publication Data
US 2015/0068822 A1 Mar. 12, 2015

Related U.S. Application Data

(63) Continuation of application No. 13/930,118, filed on Jun. 28, 2013, now Pat. No. 8,890,006.

(60) Provisional application No. 61/666,387, filed on Jun. 29, 2012.

(51) Int. Cl.
G01G 23/01 (2006.01)
G01G 21/26 (2006.01)
B66C 15/00 (2006.01)
B66C 23/74 (2006.01)

(52) U.S. Cl.
CPC ............ *G01G 23/01* (2013.01); *B66C 15/00* (2013.01); *B66C 23/74* (2013.01); *G01G 21/26* (2013.01); *B65D 2590/0058* (2013.01)

(58) Field of Classification Search
CPC ......... G01G 23/01; G01G 21/26; B66C 23/74
USPC .............................. 73/1.13, 1.15; 177/50, 264
See application file for complete search history.

(56) References Cited

U.S. PATENT DOCUMENTS

| | | |
|---|---|---|
| 442,860 A | 12/1890 | Cooley et al. |
| 787,320 A | 4/1905 | Arthur |
| 1,532,136 A | 4/1925 | Graf |
| 3,997,015 A | 12/1976 | Lamb |
| 6,291,920 B1 | 9/2001 | Miller et al. |
| 6,578,441 B1 | 6/2003 | Jurenka et al. |
| 6,725,730 B2 | 4/2004 | Bollinger, Jr. |
| 7,478,551 B2 | 1/2009 | Tellenbach et al. |
| 8,511,489 B2 | 8/2013 | Pech et al. |
| 8,581,121 B2 | 11/2013 | Burkhard et al. |
| 8,683,872 B1 | 4/2014 | Khachaturian et al. |
| 2010/0224583 A1 | 9/2010 | Mentink et al. |
| 2011/0049156 A1 | 3/2011 | Long, Jr. |

FOREIGN PATENT DOCUMENTS

| | | |
|---|---|---|
| DE | 263043 | 12/1988 |
| DE | 19803780 | 7/1999 |
| DE | 10019863 | 10/2001 |

(Continued)

OTHER PUBLICATIONS

Machine translation of DE 198 03 780 downloaded Aug. 23, 2016.*
International Search Report and Written Opinion for Application No. PCT/IB2013/001387 dated Oct. 10, 2013 (7 pages).

*Primary Examiner* — Natalie Huls
(74) *Attorney, Agent, or Firm* — Michael Best & Friedrich LLP

(57) ABSTRACT

A test weight system includes a first assembly having a first body member and a plurality of ear members arranged about the first body member. The test weight system also includes a second assembly interlocked with the first assembly, the second assembly having a second body member defining a plurality of slots. A portion of each ear member extends through one of the plurality of slots.

21 Claims, 7 Drawing Sheets

(56) References Cited

FOREIGN PATENT DOCUMENTS

| | | |
|---|---|---|
| EP | 0311235 | 4/1989 |
| FR | 2776385 | 9/1999 |
| JP | 59150322 | 8/1984 |
| JP | 2004324352 | 11/2004 |
| SU | 486998 | 10/1975 |
| SU | 1207990 | 1/1986 |
| WO | 02090233 | 11/2002 |
| WO | 2007141398 | 12/2007 |
| ZA | 868836 | 11/1986 |

* cited by examiner

INTERLOCKING TEST WEIGHT SYSTEM

CROSS-REFERENCE TO RELATED APPLICATIONS

This application is a continuation of U.S. patent application Ser. No. 13/930,118, filed Jun. 28, 2013, which claims the benefit of U.S. Provisional Patent Application No. 61/666,387, filed Jun. 29, 2012, the entire contents of each of which are incorporated herein by reference.

BACKGROUND OF THE INVENTION

The present invention relates to test weight assemblies for the testing and certification of material handling equipment. More specifically, the present invention relates to test weight assemblies for nuclear material handling, such as the handling of spent nuclear fuel casks and reactor components. Test weight assemblies constructed of water bags, concrete blocks, or buckets of scrap metal are impractically large and may be unstable. Furthermore, those systems may be inappropriate for use in a nuclear utility environment due to difficulties in decontamination and not being rated for seismic activity.

SUMMARY OF THE INVENTION

In accordance with one construction, a test weight system includes a first assembly having a first body member and a plurality of ear members arranged about the first body member. The test weight system also includes a second assembly interlocked with the first assembly, the second assembly having a second body member defining a plurality of slots. A portion of each ear member extends through one of the plurality of slots.

In accordance with another construction, a test weight system includes an inner assembly having a cylindrical body and a plurality of notched ear members arranged circumferentially around the cylindrical body. The test weight system also includes an upper assembly interlocked with the inner assembly, the upper assembly having a plate defining a plurality of slots arranged circumferentially along the plate. An upper portion of each ear member extends through one of the plurality of slots. The test weight system also includes an outer assembly interlocked with the inner assembly, the outer assembly having an annular body with an outer wall and an inner wall, and a plurality of axially extending rib members disposed along the inner wall that couple the outer assembly to the inner assembly.

In accordance with another construction, a method of assembling a test weight system includes aligning, along a common axis, a first assembly having a plurality of ear members with a second assembly having a plurality of slots. The method also includes extending portions of the ear members through the slots along an axial direction, and rotating the first assembly about the axis relative to the second assembly, until the first assembly is interlocked with the second assembly.

In accordance with another construction, a test weight system includes an inner assembly, and outer assembly, and an upper assembly disposed along an axis. The inner assembly includes a substantially planar plate, a cylindrical body extending axially from the plate, and a plurality of ear members arranged circumferentially about the cylindrical body. Each ear member defines a notch. The outer assembly includes an annular body defining an inner wall. The inner wall is configured to be received by the cylindrical body of the inner assembly. An axially parallel rib member is coupled to the inner wall. The rib member is slidably received between adjacent ear members to substantially inhibit rotation of the outer assembly relative to inner assembly about the axis. An upper assembly includes an upper body defining a plurality of slots. The plurality of slots is configured to receive the plurality of ear members. Rotation of the upper assembly about the axis engages the upper body with the notches of the plurality of ear members.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

Figure 1:
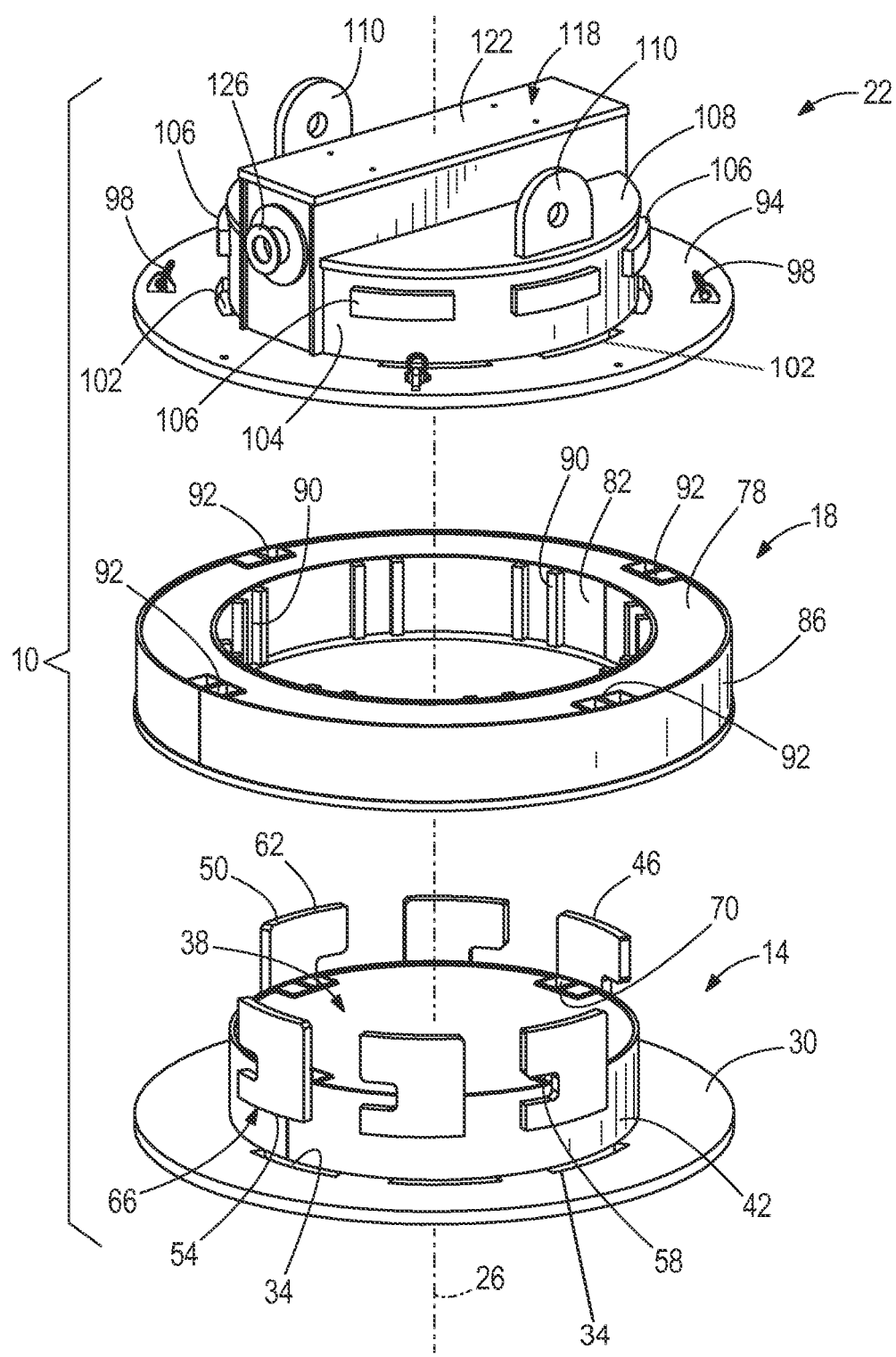
FIG. 1 is an exploded view of a test weight assembly according to one embodiment of the invention.

Referring to FIG. 1, a test weight assembly 10 includes an inner assembly 14, an outer assembly 18, and an upper assembly 22, each oriented along a vertical axis 26. As used herein, a test weight assembly may include any combination of at least one inner assembly 14 and one upper assembly 22.

The inner assembly 14 includes a substantially planar, disc-like bottom plate 30. The bottom plate 30 defines circumferentially arranged slots 34. The slots 34 surround a substantially cylindrical inner body 38 that extends axially from the bottom plate 30. The inner body 38 includes an outer wall 42.

Figure 4:
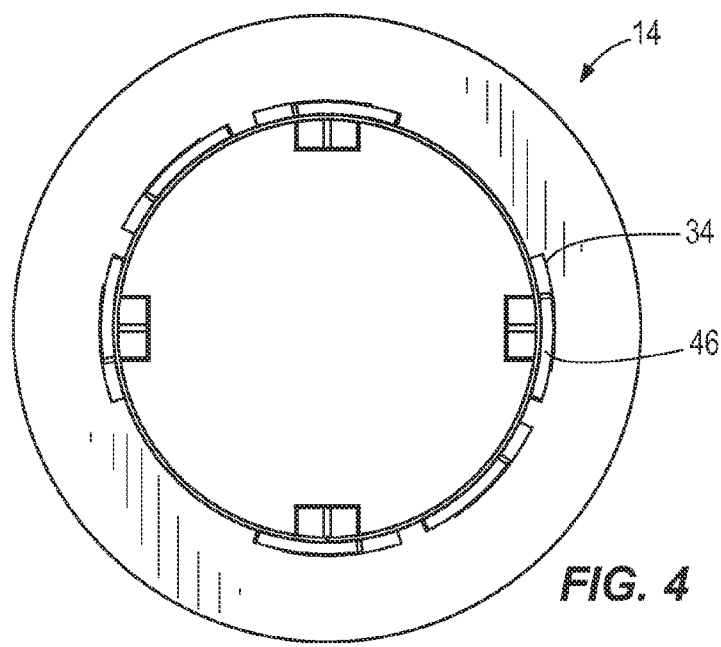
FIG. 4 is a top view of the inner assembly of the test weight to FIG. 1.

Ear members 46 are coupled to, and circumferentially arranged about, the outer wall 42. Each ear member 46 includes a top surface 50, a bottom surface 54, and a notch 58 disposed between the top surface 50 and the bottom surface 54. An upper ear portion 62 is defined between the notch 58 and the top surface 50, while a lower ear portion 66 is defined between the notch 58 and the bottom surface 58. The number and arrangement of the ear members 46 corresponds to the number and arrangement of slots 34 in the bottom plate 30. FIG. 4 illustrates the relative circumferential orientation of an embodiment of the inner assembly including six slots 34 and ear members 46. Further embodiments may include fewer or more slots and ear members. In some constructions the number of ear members 46 is not equal to the number of slots 34.

Figure 2:
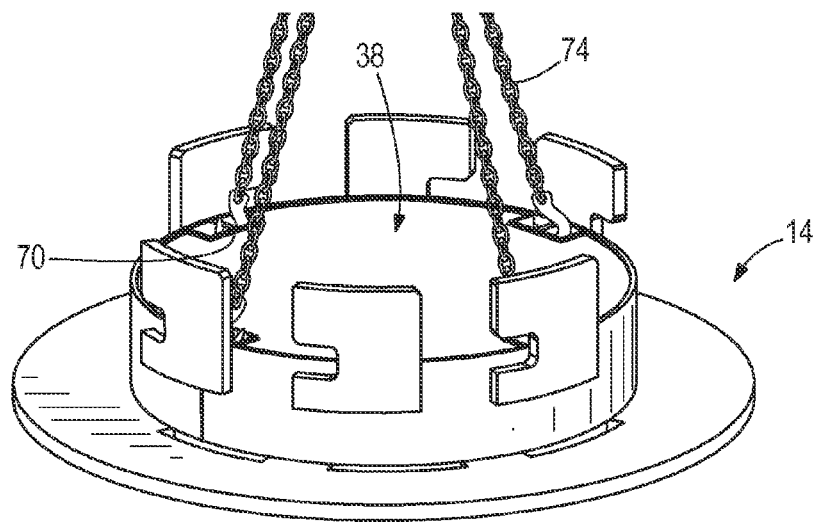
FIG. 2 is a perspective view of an inner assembly of the test weight of FIG. 1, with an overhead support.

Referring to FIG. 2, four recessed lugs 70 are coupled to the inner body 38 for lifting and handling of the inner assembly 14 with a four-point hook assembly 74. In other constructions, a different structure other than a four-point hook assembly 74 may be used to lift and handle the inner assembly 14.

Referring to FIG. 1, the outer assembly 18 includes an annular body 78, defining an inside surface 82 and an outside surface 86. The inside surface 82 has a diameter sized to receive the inner body 38 of the inner assembly 14. Pairs of axially parallel alignment ribs 90 are coupled to the inner surface 82. The alignment ribs 90 are spaced apart such that the ribs 90 may be slidably received between the ear members 46 of the inner assembly 14, thereby substantially inhibiting rotational movement of the outer assembly 18 relative to the inner assembly 14 about the axis 26.

Figure 3:
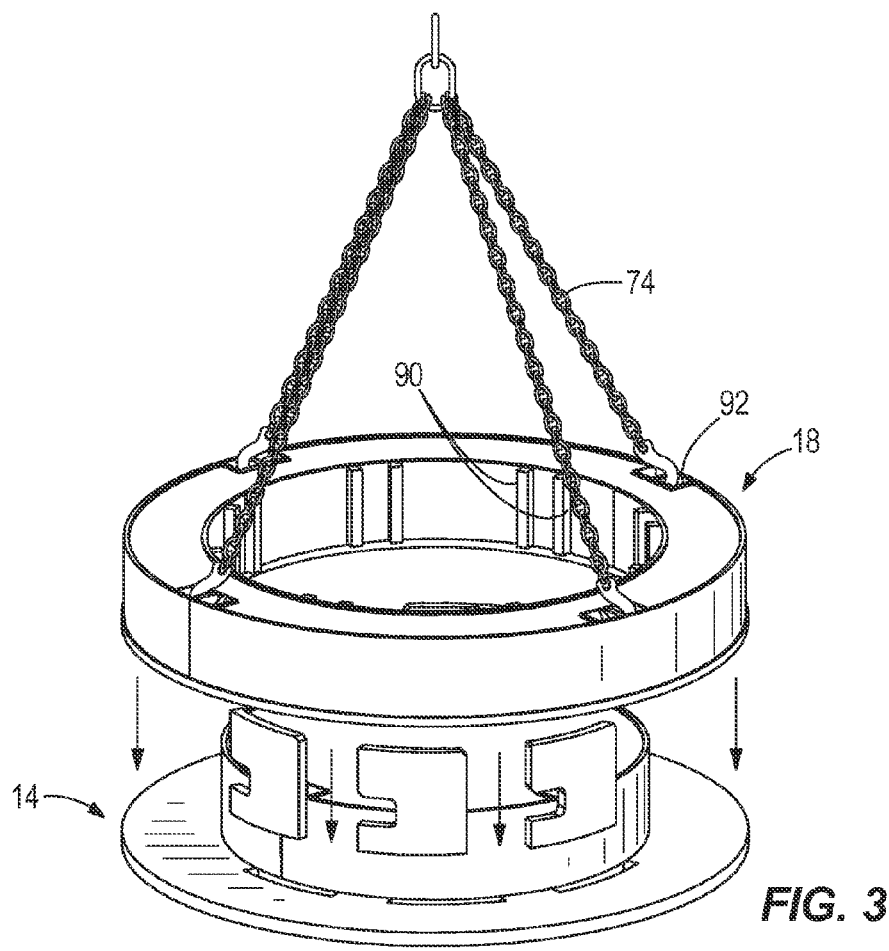
FIG. 3 is a perspective view of an outer assembly of the test weight of FIG. 1, being lowered upon the inner assembly.

Referring to FIG. 3, four recessed lugs 92 are coupled to the annular body 78 for lifting and handling of the outer assembly 18 with the four-point hook assembly 74.

The upper assembly 22 includes a disc-like top plate 94. Four shackles 98 are pivotally coupled to the top plate 94 for lifting and handling of the upper assembly 22 or a complete test weight assembly 10 (FIG. 8) with the four-point hook assembly 74. The top plate 94 defines circumferentially arranged slots 102. The slots 102 are dimensioned and arranged in a substantially identical manner to the slots 34 of the inner assembly 14.

Figure 8:
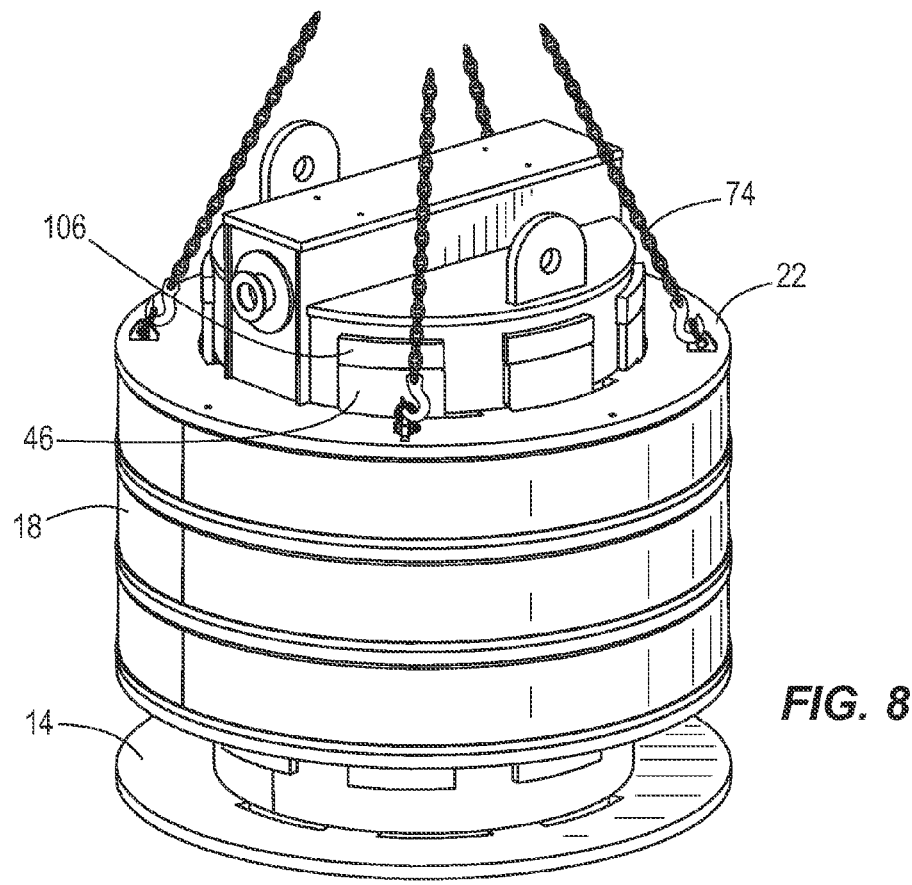
FIG. 8 is a perspective view of a test weight including four inner assemblies, three outer assemblies, and an upper assembly.
Figure 9:
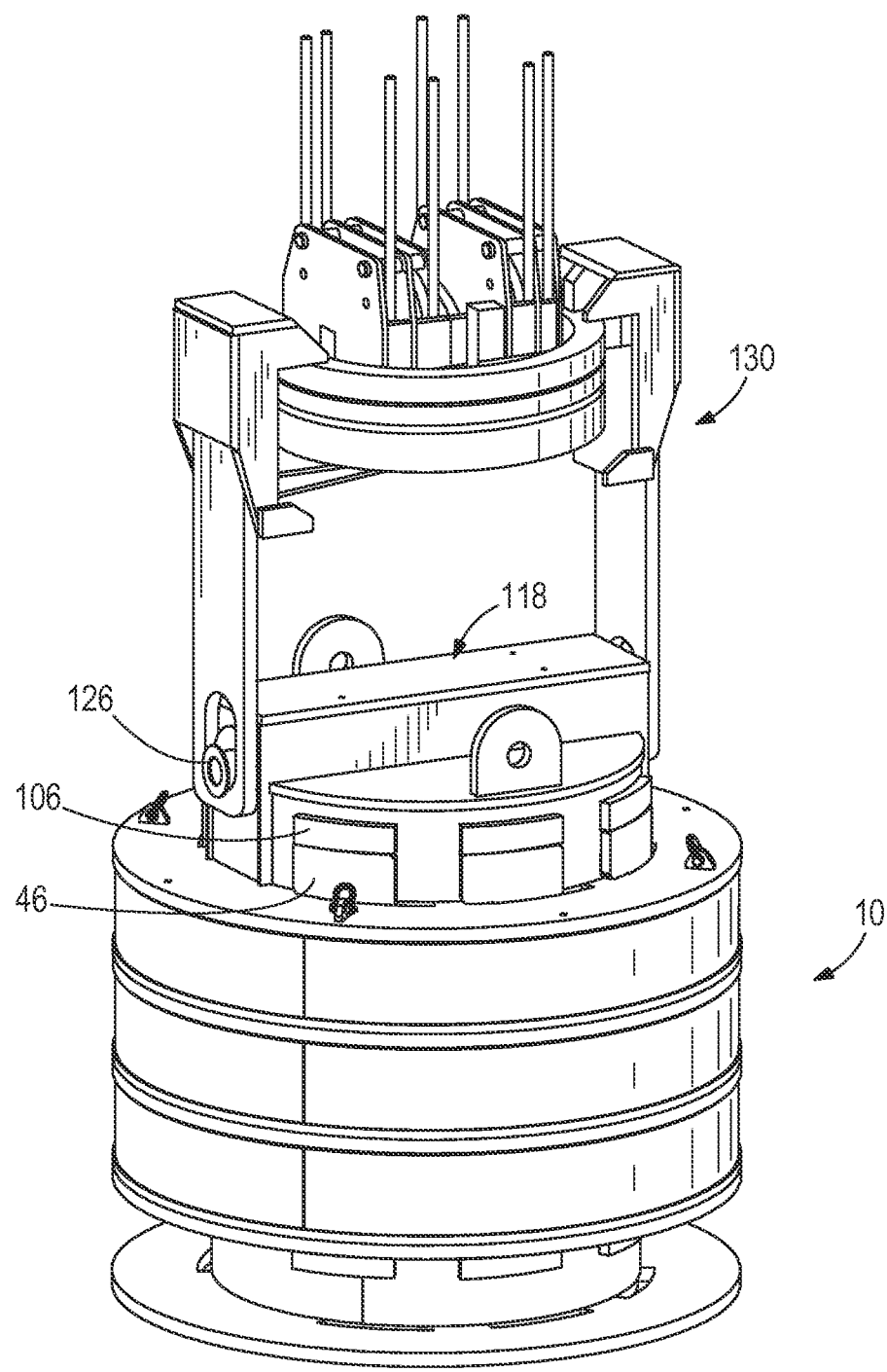
FIG. 9 is a perspective view of the test weight of FIG. 8, supported by a block. assembly.

The slots 102 surround a substantially cylindrical upper body 104 that extends axially from the top plate 94. Ear stop members 106 are circumferentially arranged about, and extend radially from, the upper body 104. As shown in FIGS. 8 and 9, the ear stop members 106 are configured to contact the top surface 50 of the respective ear member 46 of the upper most inner assembly 14.

Figure 11:
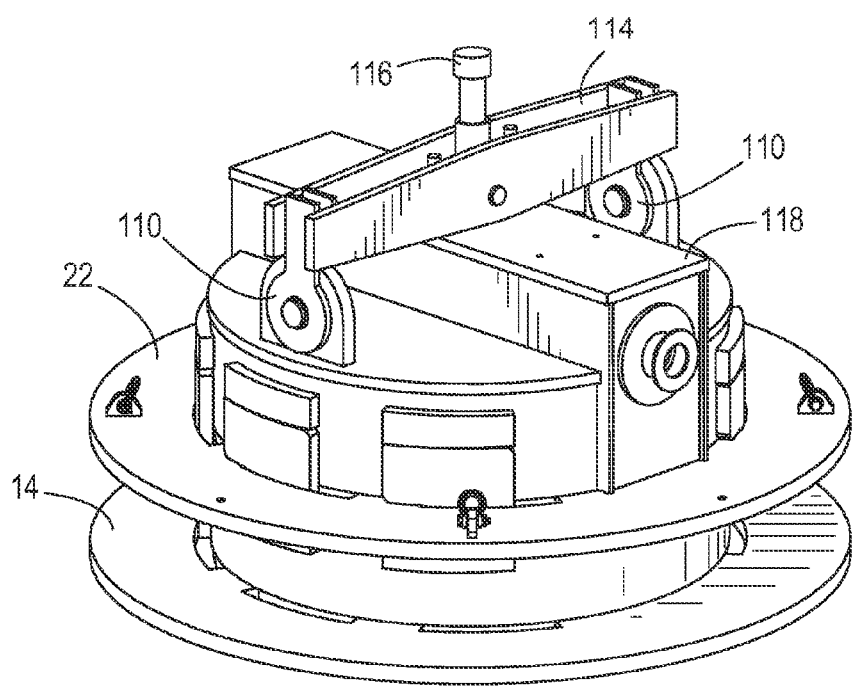
FIG. 11 is a perspective view of a test weight including a first inner assembly, a second inner assembly, a ring member, an upper assembly, and a beam assembly.

Boss members 110 are coupled to a top surface 108 of the inner body 104. Referring to FIG. 11, the boss members 110 interface with an optional beam assembly 114, which includes a crane hook 116.

Referring back to FIG. 1, a block interface 118 is also coupled to the upper body 106. The block interface 118 includes a rectangular body 122 and lobe members 126 extending from opposite ends of the body 122. Referring to FIG. 9, the lobe members 126 are configured to interface with a block assembly 130. The block assembly 130 may be, for example, a bottom block for use in spent nuclear fuel transfer. The overall size, diameter, and shape of the test weight 10 may substantially simulate a nuclear fuel cask.

Figure 5:
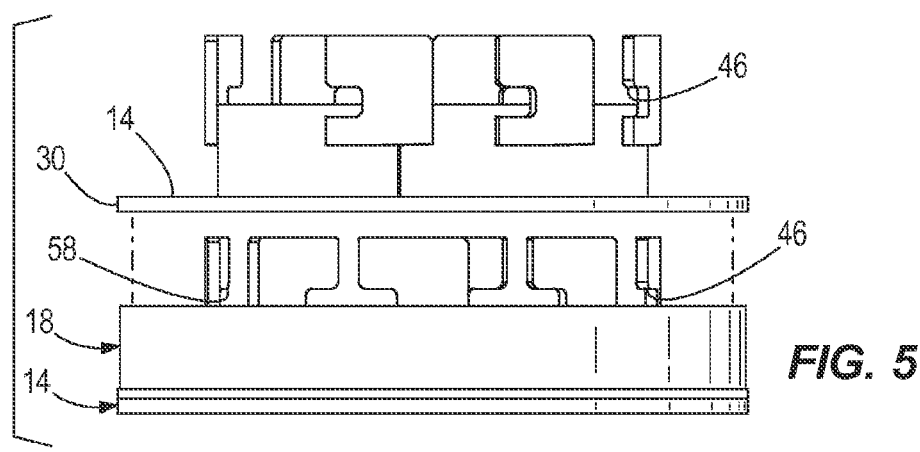
FIG. 5 is a side view of a second inner assembly being lowered upon a test weight assembly including a first inner assembly and an outer assembly.
Figure 6:
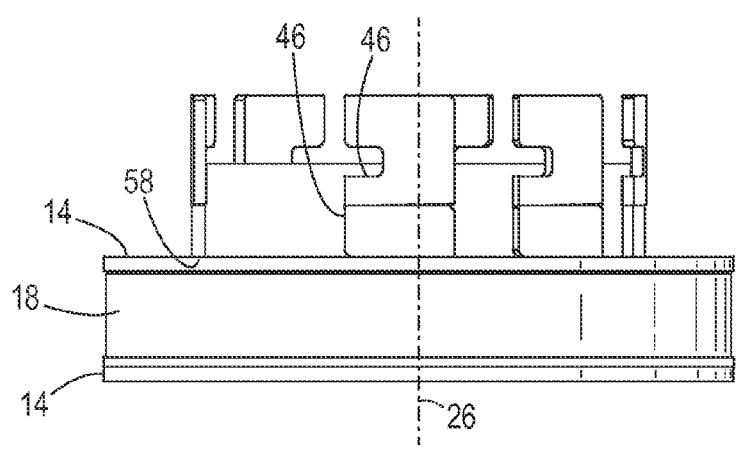
FIG. 6 is a side view of a subassembly including the first inner assembly, the outer assembly, and the second inner assembly of FIG. 5.

Combinations of inner assemblies 14, outer assemblies 18, and an upper assembly 22 may be assembled as follows. First, an inner assembly 14 is positioned at an assembly location (FIG. 2). Referring to FIG. 3, an outer assembly 18 is placed over the inner assembly 14, with one of the pairs of ribs 90 of the outer assembly 18 aligned between a pair of adjacent ear members 46 of the inner assembly 14. Referring to FIGS. 4-6, and depending on the desired weight to be tested, the slots 34 of a second inner assembly 14 are placed over the ears 46 of the first inner assembly. The second inner assembly 14 is rotated about the axis 26 until the notch 58 of the first inner assembly ear member 46 receives a portion of the bottom plate 30 of the second assembly 14 and the top of the first assembly ear 46 (upper ear portion 62) is locked against the bottom surface 54 of the second assembly ear 46. Again, depending on the weight desired, a second outer assembly 18 may be placed over the second inner assembly 14. This is continued until the final desired weight is reached. Finally, the upper assembly 22 is attached to the test weight assembly 10 in the same manner as an inner assembly 14 (FIG. 8). As illustrated in FIGS. 2, 3, 7, and 8, the arrangement and movement of the inner assemblies 14, outer assemblies 18, and upper assembly 22 relative to one another is accomplished by utilizing the four-point hook assembly 74, or other lifting assembly, described above.

Figure 7:
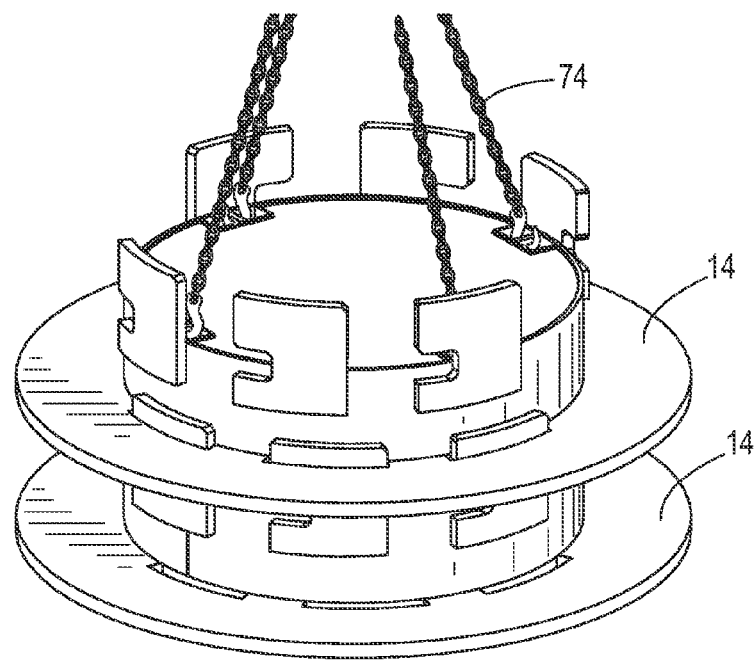
FIG. 7 is a perspective view of a test weight including a first inner assembly and a second inner assembly.

While an outer assembly 18 requires an inner assembly 14, the reverse is not true. FIG. 7 illustrates a configuration with a first inner assembly 14 and a second inner assembly 14, but no test weight assembly 10 can consist of only outer assemblies and an upper assemblies.

Table 1 lists the nominal weights of various combinations of inner assemblies 14 and outer assemblies 18. Since there cannot be more outer assemblies 18 than inner assemblies 14, the blank areas in the table are those combinations that are not possible. Each combination includes an upper assembly, which is required for lifting purposes. The weights in Table 1 are nominal values and represent just one example of a set of weight values for inner and outer assembly combinations.

TABLE 1

Combinations of Nominal Weights (lbs)

| UPPER | | INNER WEIGHT | | | | | | | |
|---|---|---|---|---|---|---|---|---|---|
| 53,147 | | 0 | 1 | 2 | 3 | 4 | 5 | 6 | 7 |
| OUTER | 0 | 53,147 | 94,368 | 135,590 | 176,812 | 218,034 | 259,256 | 300,477 | 341,699 |
| WEIGHT | 1 | X | 125,441 | 166,663 | 207,885 | 249,107 | 290,328 | 331,550 | 372,772 |
| | 2 | X | X | 197,736 | 238,958 | 280,179 | 321,401 | 362,623 | 403,845 |
| | 3 | X | X | X | 270,030 | 311,252 | 352,474 | 393,696 | 434,918 |
| | 4 | X | X | X | X | 342,325 | 383,547 | 424,769 | 465,990 |
| | 5 | X | X | X | X | X | 414,620 | 455,841 | 497,063 |
| | 6 | X | X | X | X | X | X | 486,914 | 528,136 |

The method of assembly of the test weight 10, as described above, provides for positive interlocking and retention of the inner assembly 14, outer assembly 18, and upper assembly 22 relative to each other. This interlocking construction allows for the test weight 10 to be rated or certified for use under conditions of potential seismic activity.

Each of the inner assembly 14, the outer assembly 18, and the upper assembly 22 may be painted or otherwise finished. A painted finish facilitates decontamination of the individual pieces such that they may be removed from a nuclear power plant's containment building. Additionally, each component piece may be permanently marked with its calibrated weight traceable to a national standard (N.I.S.T), and the actual weight is easy to document for regulatory tests.

Figure 12:
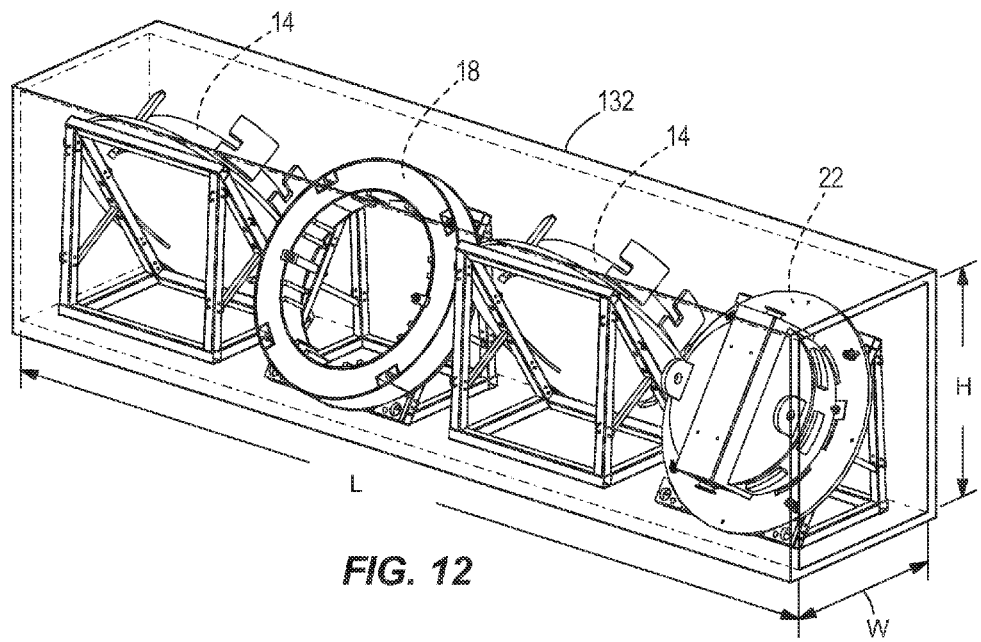
FIG. 12 is a perspective view of test weight components disposed in a transport container.
Figure 13:
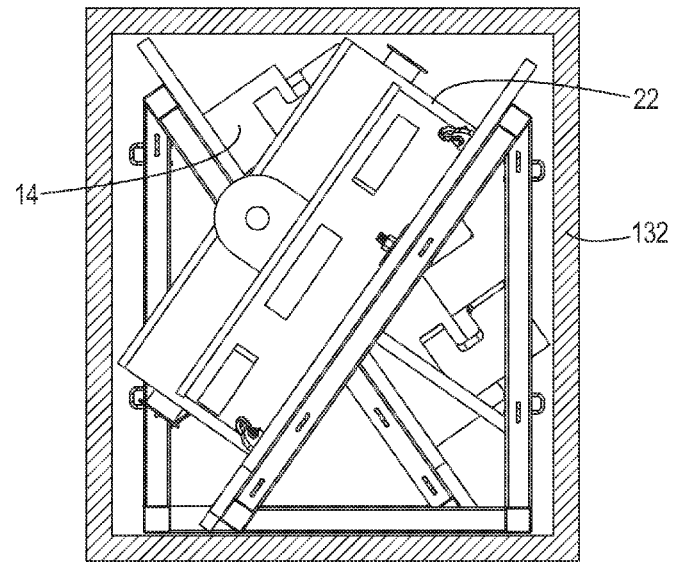
FIG. 13 is a perspective view of test weight components disposed in a transport container.

FIGS. 12 and 13 illustrate two inner assemblies 14, an outer assembly 18, and an upper assembly 18 disposed within a shipping container 132 of a standard configuration having a length L of approximately 534 inches, a width W of approximately 96 inches, and a height H of approximately 117 inches. Other configurations of the shipping container 132 have different dimensions. The ability to fit within a shipping container 132 allows these components to be efficiently shipped worldwide.

Figure 10:
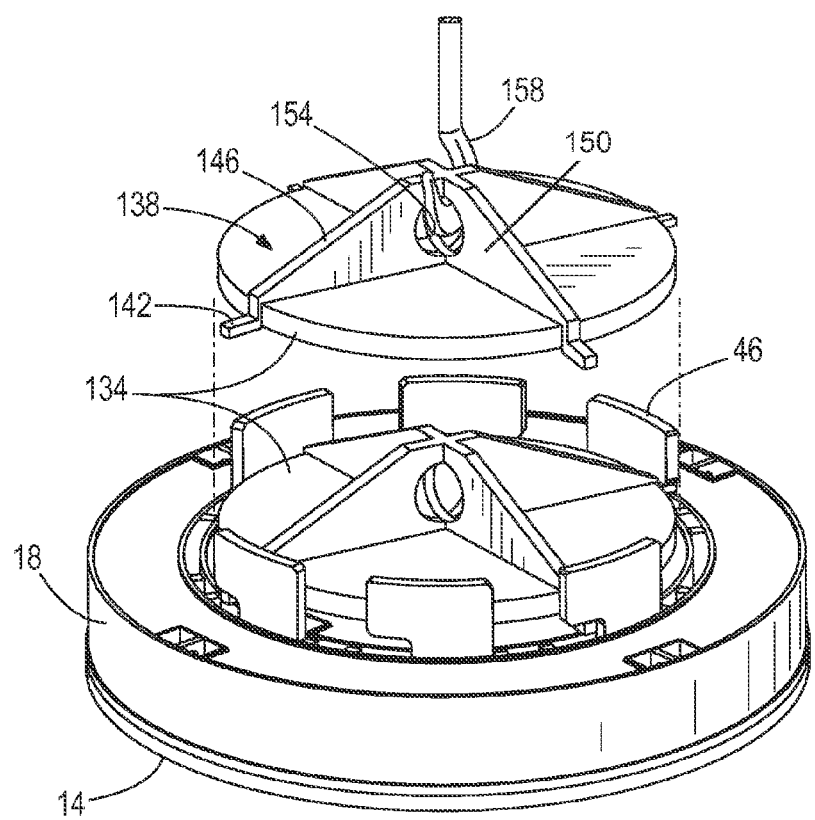
FIG. 10 is a perspective view of test weight including an inner assembly, outer assembly, and a spider upper assembly.

FIG. 10 illustrates another configuration of an upper assembly, more specifically, a spider upper assembly 134. The spider upper assembly 134 includes a disk-like base plate 138. Notch engagement members 142 extend radially from the base plate 138. The notch engagement members 142 are received by the notches 58 of the ear member 46 of the inner assembly 14 to secure the spider upper assembly 134 to the inner assembly 14. Intersecting beam members 146 and 150 are coupled to a top surface of the base plate 138. The intersection of the beam members 146 and 150 defines an aperture 154 for receiving a lifting hook 158.

Thus, the invention provides, among other things, a test weight assembly.

What is claimed is:

1. A test weight system comprising:
   a first assembly having a first body member, the first body member having a first end and a second end spaced from the first end along an axis, the first assembly further having a plurality of engagement members arranged circumferentially about the axis and coupled to the first body member along an exterior of the first body member, wherein each of the engagement members includes a portion that extends axially past the second end of the first body member along a direction opposite from the first end of the first body member; and
   a second assembly configured to be interlocked with the first assembly, the second assembly having a second body member defining a plurality of slots, wherein a portion of each engagement member is configured to extend through one of the plurality of slots.

2. The test weight system of claim 1, wherein the second body member is a plate.

3. The test weight system of claim 1, wherein the second assembly includes a cylindrical body extending axially from the second body member.

4. The test weight system of claim 3, wherein the plurality of slots are circumferentially arranged about the cylindrical body.

5. The test weight system of claim 3, wherein the second assembly includes a plurality of stop members extending radially outwardly from the cylindrical body.

6. The test weight system of claim 5, wherein the stop members extend circumferentially about the cylindrical body.

7. The test weight system of claim 6, wherein the stop members are configured to engage the engagement members to limit axial movement of the engagement members.

8. The test weight system of claim 1, wherein each of the engagement members defines a top surface, a bottom surface, and a notch disposed between the top surface and the bottom surface.

9. The test weight system of claim 8, wherein the notches are configured to engage the second body member to interlock the first assembly to the second assembly.

10. A method of assembling a test weight system comprising:
    aligning, along a common axis, a first assembly having a plurality of engagement members with a second assembly having a plurality of slots;
    extending portions of the engagement members through the slots along an axial direction;
    rotating the first assembly about the axis relative to the second assembly, until the first assembly is interlocked with the second assembly; and
    aligning a third assembly along the common axis and, prior to interlocking the first assembly with the second assembly, interlocking the third assembly to the first assembly, the third assembly having an identical structure to that of the first assembly.

11. The method of claim 10, wherein the second assembly includes a plurality of stop members, and the method includes engaging surfaces of the engagement members with surfaces of the stop members.

12. The method of claim 10, wherein the engagement members have notches, the method including engaging the notches with the second assembly.

13. The method of claim 10, wherein the slots are upper assembly slots, and wherein the first assembly includes a plurality of inner assembly slots, the method including extending portions of engagement members of the third assembly through the inner assembly slots.

14. The method of claim 13, further including rotating the first assembly with respect to the third assembly after the portions of the engagement members of the third assembly have been extended through the inner assembly slots.

15. The method of claim 14, further including engaging surfaces of the engagement members of the third assembly with surfaces of the engagement members of the first assembly after the portions of the engagement members of the third assembly have been extended through the inner assembly slots.

16. The method of claim 10, further including lifting the assembled test weight system with shackles coupled to the second assembly.

17. The method of claim 10, wherein the slots extend circumferentially about the second assembly.

18. The method of claim 10, wherein the engagement members extend circumferentially about the first assembly.

19. A method of assembling a test weight system comprising:
    aligning, along a common axis, a first assembly having a plurality of engagement members with a second assembly having a plurality of slots;
    extending portions of the engagement members through the slots along an axial direction;
    rotating the first assembly about the axis relative to the second assembly, until the first assembly is interlocked with the second assembly; and aligning a third assembly along the common axis and, prior to interlocking the first assembly with the second assembly, interlocking the third assembly to the first assembly, the third assembly having an annular body defining an inner wall.

20. A method of assembling a test weight system comprising:

aligning, along a common axis, a first assembly having a plurality of engagement members with a second assembly having a plurality of slots;

extending portions of the engagement members through the slots along an axial direction;

rotating the first assembly about the axis relative to the second assembly, until the first assembly is interlocked with the second assembly; and lifting the assembled test weight system with a lifting member coupled to the second assembly.

21. The method of claim 20, wherein the lifting member is a shackle coupled to the second assembly.

* * * * *